United States Patent
Burnside et al.

(10) Patent No.: US 11,015,526 B2
(45) Date of Patent: May 25, 2021

(54) OIL FLOW ENHANCER BEARING ASSEMBLY

(71) Applicant: Rolls-Royce Corporation, Indianapolis, IN (US)

(72) Inventors: Phillip H. Burnside, Avon, IN (US); Angela Turk, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1325 days.

(21) Appl. No.: 14/962,353

(22) Filed: Dec. 8, 2015

(65) Prior Publication Data

US 2016/0326959 A1    Nov. 10, 2016

Related U.S. Application Data

(60) Provisional application No. 62/089,420, filed on Dec. 9, 2014.

(51) Int. Cl.
| | |
|---|---|
| *F02C 7/06* | (2006.01) |
| *F01D 25/18* | (2006.01) |
| *F16C 33/66* | (2006.01) |
| *F16C 19/06* | (2006.01) |

(52) U.S. Cl.
CPC .............. *F02C 7/06* (2013.01); *F01D 25/18* (2013.01); *F16C 33/6685* (2013.01); *F05D 2240/70* (2013.01); *F05D 2250/71* (2013.01); *F16C 19/06* (2013.01); *F16C 33/6659* (2013.01); *F16C 2360/23* (2013.01)

(58) Field of Classification Search
CPC . F01D 25/16; F01D 25/18; F02C 7/06; F05D 2240/50; F05D 2240/70
See application file for complete search history.

(56) References Cited

U.S. PATENT DOCUMENTS

| | | |
|---|---|---|
| 3,393,025 A | 7/1968 | Jenkins |
| 4,565,937 A | 1/1986 | Uhen |
| 4,781,476 A | 11/1988 | Uhen |
| 4,915,515 A | 4/1990 | Rohrer et al. |
| 5,150,769 A | 9/1992 | Major et al. |
| 5,150,975 A | 9/1992 | Major et al. |
| 5,724,934 A | 3/1998 | Faraci et al. |

(Continued)

FOREIGN PATENT DOCUMENTS

| | | |
|---|---|---|
| EP | 0801217 A1 | 10/1997 |
| EP | 1245793 A1 | 10/2002 |
| WO | WO-2014014791 A1 | 1/2014 |

OTHER PUBLICATIONS

European Search Report dated May 4, 2016.

*Primary Examiner* — Arun Goyal
(74) *Attorney, Agent, or Firm* — Fishman Stewart PLLC

(57) ABSTRACT

A bearing assembly may comprise a housing, a slinger disk, and a bearing. The housing may be configured to receive a shaft and having at least one scavenge passage between an outer housing portion and an inner housing portion. The slinger disk may have a plurality of flow guides configured to direct the lubricant flow toward the at least one scavenge channel. The scavenge passage may be configured to provide a lubricant flow through the bearing. Lubricant flow may be provided in a forward direction, through the bearing and opposite a windage direction.

12 Claims, 5 Drawing Sheets

(56) References Cited

U.S. PATENT DOCUMENTS

| | | | | |
|---|---|---|---|---|
| 8,328,509 B2 * | 12/2012 | Gee | ............... | F01D 11/003 |
| | | | | 415/180 |
| 8,419,287 B2 | 4/2013 | Liu | | |
| 9,850,911 B2 * | 12/2017 | Dayalan | ............... | F16C 17/10 |
| 2002/0141862 A1 * | 10/2002 | McEwen | ............... | F01D 25/18 |
| | | | | 415/111 |

* cited by examiner

OIL FLOW ENHANCER BEARING ASSEMBLY

CROSS-REFERENCE TO RELATED APPLICATIONS

This application claims priority to U.S. Provisional Patent Application No. 62/089,420 filed Dec. 9, 2014, the contents of which is hereby incorporated in its entirety.

FIELD OF TECHNOLOGY

The present disclosure relates to gas turbine engines, and more particularly, but not exclusively, to an apparatus, system, and method including a bearing assembly having an oil flow enhancer configured to enhance lubricant flow through the bearing, thereby increasing the service life of the system and requiring less repair of the same.

BACKGROUND

Gas turbine engines typically include a compressor, a gearbox, a turbine, and a combustor. The compressor compresses air drawn into the engine and delivers high pressure air to the combustor. In the combustor, fuel is mixed with the high pressure air and is ignited. Products of a combustion reaction in the combustor are directed into the turbine where work is extracted to drive the compressor and a shaft at a rotational speed. The forward and aft sides of the shaft may be radially and axially supported by one or more bearing assemblies. Each bearing assembly includes a bearing that is typically lubricated with a lubricant (e.g., oil) using jets. However, the high rotational speed of the shaft and the effects of windage from the air movement within the engine, higher pressure may form on the forward side of the bearing and lower pressure may form on the aft side of the bearing. This may push lubricant in a windage or aft direction, toward the lower pressure side and away from the bearing. As a result, the traditional bearing assembly may have difficulty maintaining lubricant, especially at the forward side of the bearing. It would therefore be helpful to provide an apparatus, system, and method including an oil flow enhancer configured to direct lubricant flow in a forward direction, through the bearing assembly, thereby enhancing lubricant of the bearing assembly.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Exemplary bearing assembly for a turbine engine may comprise a housing, a slinger disk, and a bearing. The housing may be configured to receive a shaft and having one or more scavenge passages between an outer housing portion and an inner housing portion. The slinger disk may be configured to be received in at least a portion of the housing and positioned about the shaft. The bearing may be configured to be received in at least a portion of the housing and positioned about the shaft and adjacent the slinger disk. The bearing may have a higher pressure side and a lower pressure side. The one or more scavenge passages may be configured to provide a lubricant flow in a forward direction, opposite a windage or aft direction, from the lower pressure side to the higher pressure side.

The slinger disk may be defined by an inner perimeter and an outer perimeter. The slinger disk may have a plurality of flow guides extending between the inner perimeter and the outer perimeter. The plurality of flow guides may be configured to direct the lubricant flow toward the one or more scavenge passages. Thus, the slinger disk may be configured to direct lubricant flow toward the one or more scavenge passages, thereby forcing lubricant flow through the bearing in the forward direction.

The embodiments of the present disclosure may adapted to an aircraft such as a helicopter, airplane, unmanned vehicle, fixed wing vehicle, variable wing vehicle, or any other flying vehicle. Embodiments may also be adapted for industrial applications, power generators, pumping, naval propulsion, hover crafts, and any other vehicles.

Figure 1:
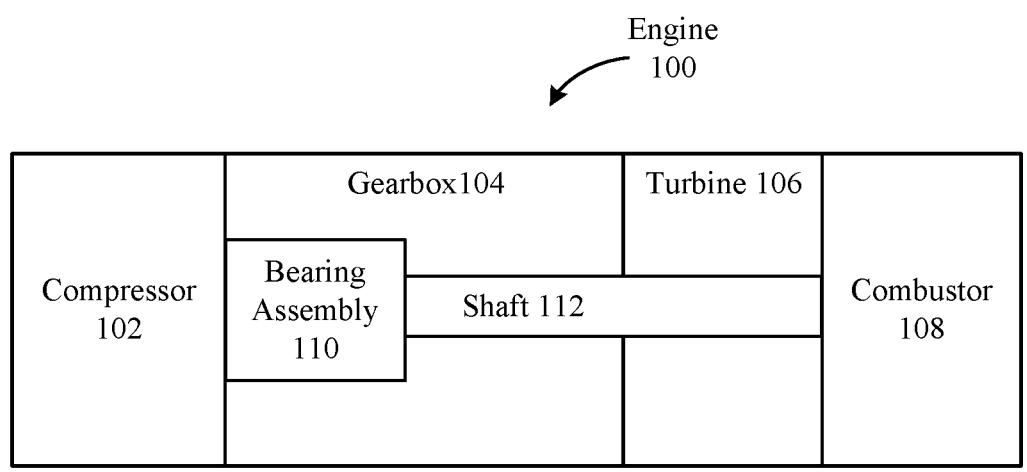
FIG. 1 schematically illustrates some aspects of one non-limiting example of a gas turbine engine system including a bearing assembly of the present disclosure.

FIG. 1 illustrates a gas turbine engine 100, a compressor 102, a gearbox 104, a turbine 106, a combustor 108, a bearing assembly 110, and a shaft 112. The bearing assembly 110 may be located at any or multiple portions of the engine 100, for example, in the gearbox 104, as shown. More specifically, the bearing assembly 110 may be located adjacent the compressor 102 and about the shaft 112. While FIG. 1 illustrates an exemplary configuration, it will be appreciated that the compressor 102, gearbox 104, turbine 106, combustor 108, bearing assembly 110, and shaft 112 may be configured in any number of other configurations.

Figure 2:
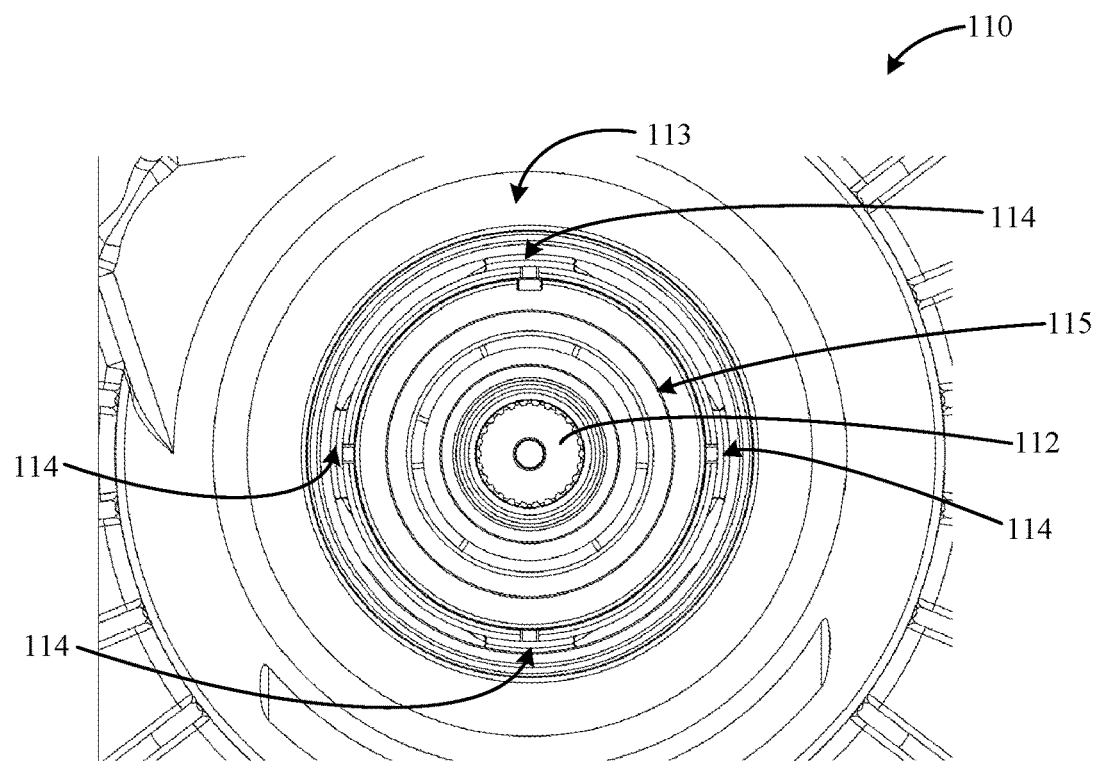
FIG. 2 illustrates a front view of the bearing assembly of FIG. 1.

Turning now to FIG. 2, there is illustrated a front view of an exemplary system including the bearing assembly 110. The bearing assembly 110 may include a housing 113 and a bearing 115. The housing 113 may be configured to receive the bearing 115. The housing 113 and bearing 115 may be positioned about the shaft 112. The housing 113 may include one or a plurality of scavenge passages 114, e.g., radially positioned at equal or varying distances and increments about the shaft 112. For example, the housing 113 may include four scavenge passages 114 radially positioned at approximately equal distances and increments relative to the shaft 112, as illustrated.

Figure 3:
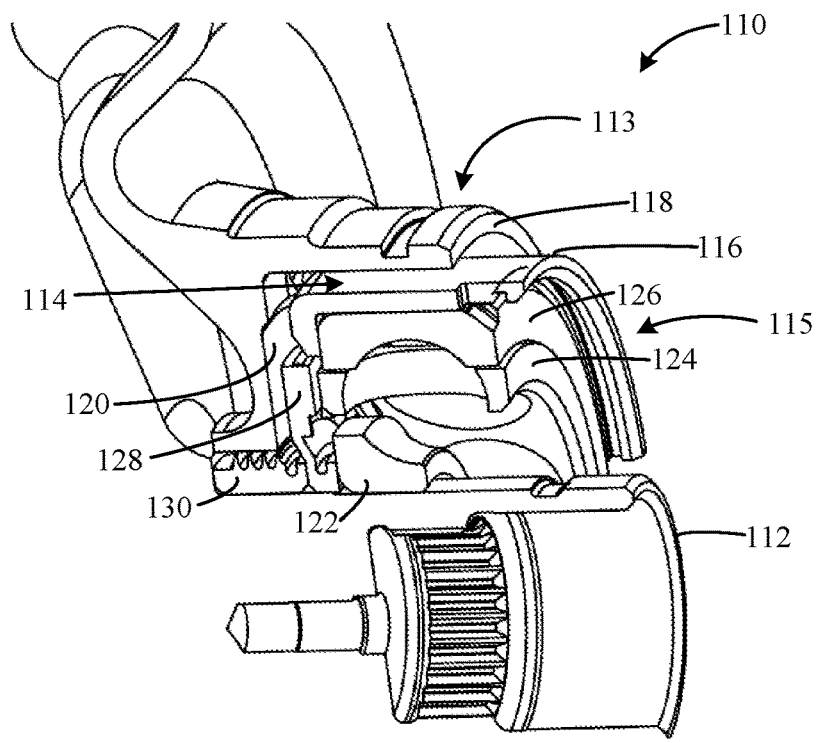
FIG. 3 illustrates a isometric section view of the bearing assembly of FIG. 2, for example, including a slinger disk.

Referring to FIG. 3, there is illustrated an isometric of the bearing assembly 110. The bearing assembly 110 may include the housing 113, the bearing 115, a slinger disk 128, and a seal 130 (e.g., a labyrinth seal). The housing 113 may include an inner housing portion 116, an outer housing portion 118, and a forward housing portion 120. The one or more scavenge passages 114 may be defined between the inner housing portion 116 and the outer housing portion 118. The bearing assembly 110 may be configured to force lubricant flow through the bearing 115, against or through the slinger disk 128, and into one or more scavenge passages 114.

Figure 4:
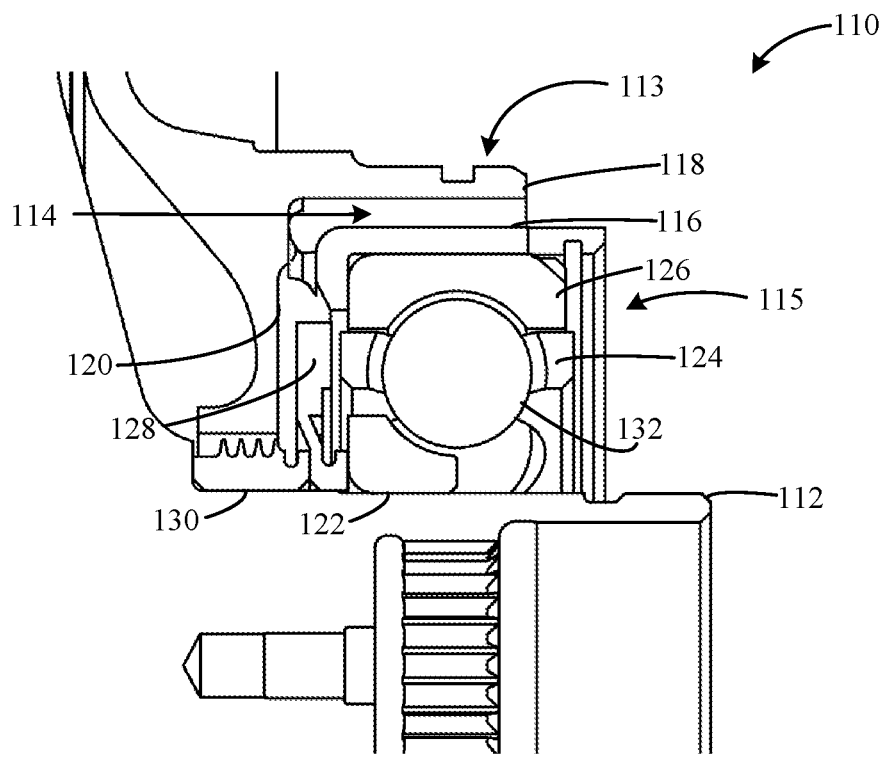
FIG. 4 illustrates a side view of the bearing assembly of FIG. 3.

With reference to FIG. 4, there is illustrated a side view of the bearing assembly 110. The bearing 115 may include a forward inner ring 122, an aft inner ring (not shown), a cage 124, an outer ring 126, and a plurality of balls 132. The bearing 115 may be configured to be received in at least a portion of the housing 113 and positioned about the shaft 112 and adjacent the slinger disk 128. The bearing 115 may be configured to radially and axially support the shaft 112 during rotation.

Figure 5:
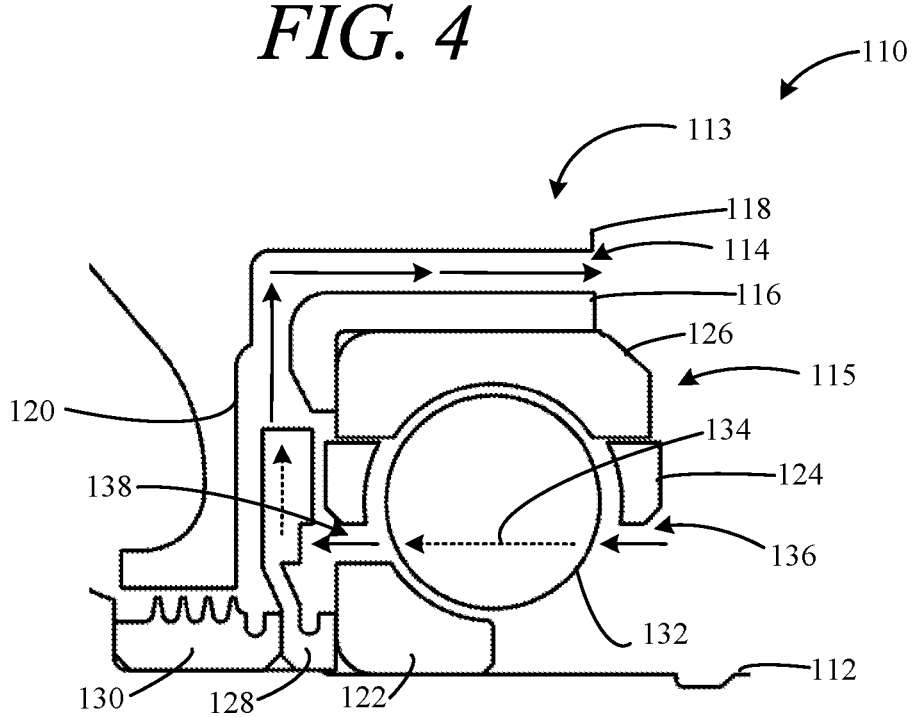
FIG. 5 illustrates a closer view of the bearing assembly of FIG. 4.

Turning now to FIG. 5, there is illustrated a closer side view of the bearing assembly 110. The bearing assembly 110 may be configured to provide lubricant flow 134 in a forward direction from a lower pressure side 136 to a higher pressure side 138. The slinger disk 128 may be configured as a radial pump thereby urging lubricant flow 134 through the bearing 115 in a forward direction, toward the higher pressure side 138 of the bearing 115, and into the one or more scavenge passages 114. The slinger disk 128 may be configured to be received in at least a portion of the housing 113 and positioned about the shaft 112. The slinger disk 128 may be configured to form a forward gap relative to the forward housing portion 120 and an aft gap relative to a forward portion of the cage 124. As such, the slinger disk 128 may be configured to direct lubricant flow 134 in an outward radial direction, toward the at least one scavenge passage 114, thereby forcing lubricant flow 134 in a forward direction, through the bearing 115.

Figure 6:
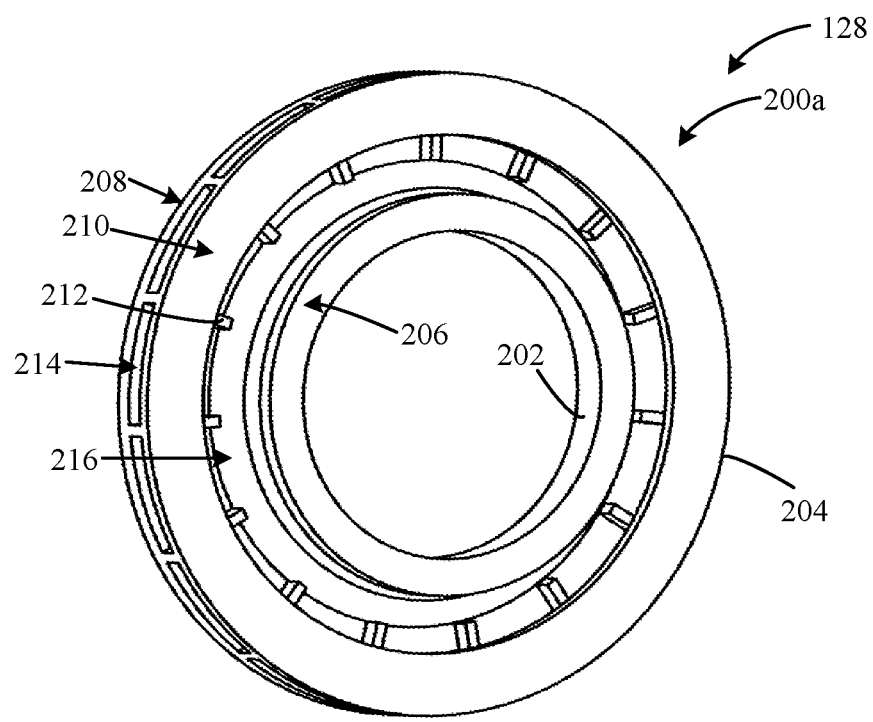
FIG. 6 illustrates an isometric view of a slinger disk, for example, the slinger disk of FIG. 3.
Figure 7:
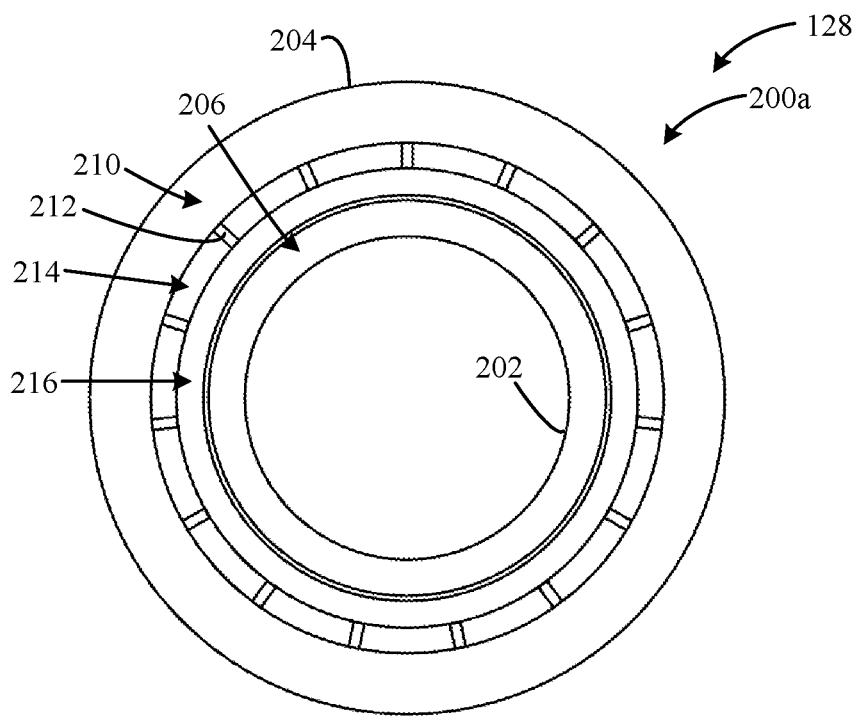
FIG. 7 illustrates a front view of the slinger disk of FIG. 6.

Referring to FIGS. 6-7, there is illustrated system 200a including an embodiment of the slinger disk 128. The slinger disk 128 may be defined by an inner perimeter 202 and an outer perimeter 204. The slinger disk 128 may include a first wall 208 and a second wall 210. The slinger disk 128 may include a hub 206 configured to be positioned about the shaft 112. The slinger disk 128 may include a plurality of flow guides 212. The plurality of flow guides 212 may be configured to direct the lubricant flow radially outward and toward the one or more scavenge passages 114. The plurality of flow guides 212 may be interposed between the first wall 208 and the second wall 210, which may define a plurality of flow channels 214 therebetween. The plurality of flow guides 212 may extend all or any of the distance between the inner perimeter 202 and the outer perimeter 204. At least a portion of the plurality of flow guides may have a linear profile (as shown in FIG. 7), angular, or a curved profile between the inner perimeter and the outer perimeter of the slinger disk.

Figure 8:
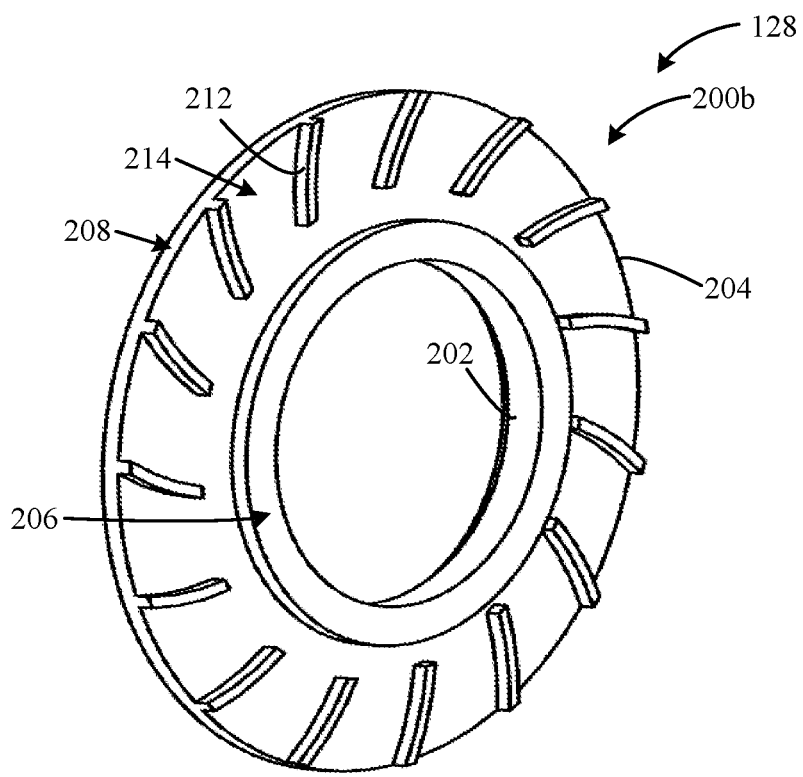
FIG. 8 illustrates an isometric view of an alternative slinger disk.
Figure 9:
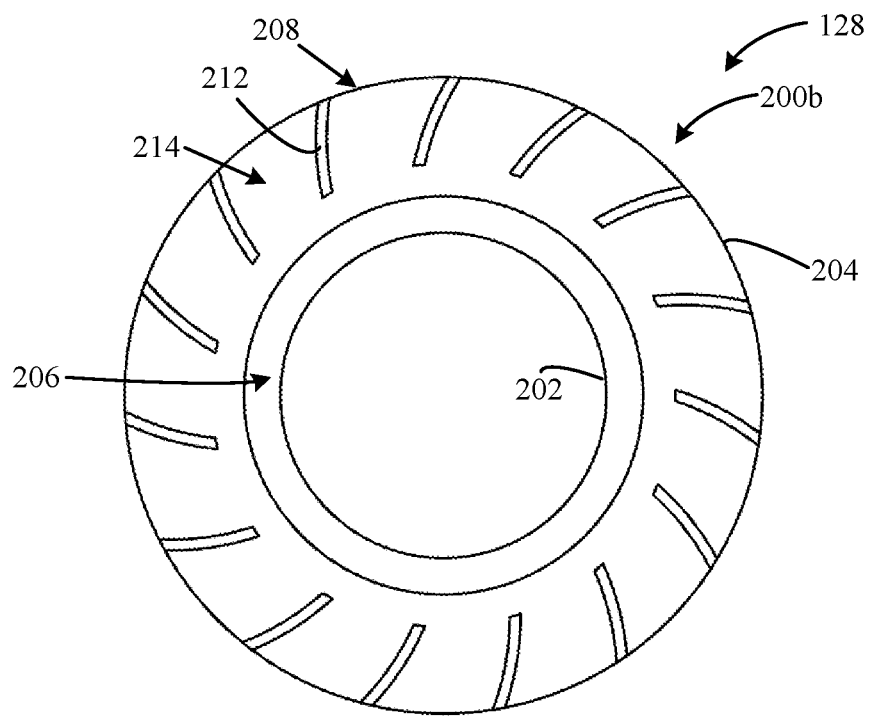
FIG. 9 illustrates a front view of the slinger disk of FIG. 8.

With reference to FIGS. 8-9, there is illustrated system 200b including another embodiment of the slinger disk 128. The slinger disk 128 may be defined by an inner perimeter 202, an outer perimeter 204, a hub 206, and a wall 208. The hub 206 may configured to be positioned about the shaft 112. The slinger disk 128 may include a plurality of flow guides 212 configured as protrusions from the wall 208, thereby defining a plurality of flow channels 214 therebetween. Alternatively, the flow guides 212 may be configured as recesses (not shown) into the wall 208, thereby defining a plurality of flow channels 214 therein. The plurality of flow guides 212 may be configured to direct the lubricant flow 134 radially outward and toward the one or more scavenge passages 114. The plurality of flow guides 212 may extend all or any of the distance between the inner perimeter 202 and the outer perimeter 204. At least a portion of the plurality of flow guides may have a curved profile (as shown in FIG. 9), angular, or a linear profile between the inner perimeter and the outer perimeter of the slinger disk.

Methods of enhancing lubricant flow are also contemplated. A method may include providing lubricant flow with a housing configured to receive a shaft and having at least one scavenge passage between an outer housing portion and an inner housing portion, directing lubricant flow toward the at least one scavenge channel with a slinger disk having a plurality of flow guides extending between the inner perimeter and the outer perimeter; and forcing lubricant flow through a bearing configured to be received in at least a portion of the housing and positioned about the shaft and adjacent the slinger disk.

As mentioned above, the disclosed system is not limited to an aerospace or aircraft gas turbines. In one example, such as a power generation system, the gas turbine may be used to actuate a generator for producing electricity. As such, this disclosure provides an apparatus, system, and method for enhancing oil flow of any suitable bearing assembly.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An oil flow enhancer bear ng assembly for a turbine engine, the assembly comprising:
   a housing configured to receive a shaft and having a forward housing portion and at least one scavenge passage between an outer housing portion and an inner housing portion, the at least one scavenge passage being configured to provide a lubricant flow;
   a slinger disk configured to be received in at least a portion of the housing and positioned about the shaft, the slinger disk being defined by an inner perimeter and an outer perimeter, the slinger disk having a first radial wall, a second radial wall, and a plurality of flow guides including protrusions interposed between opposing surfaces of the first radial wall and the second radial wall, the first radial wall, the second radial wall and the plurality of flow guides defining rectangular flow channels therebetween while providing a gap between the slinger disk and the forward housing portion, the plurality of flow guides and the opposing surfaces extending to the outer perimeter, and the plurality of flow guides being configured to direct the lubricant flow toward the at least one scavenge passage; and a bearing configured to be received in at least a portion of the housing and positioned about the shaft and adjacent the slinger disk, wherein the slinger disk is configured to direct lubricant flow toward the at least one scavenge passage thereby forcing lubricant flow through the bearing.

2. The assembly of claim 1, wherein at least a portion of the plurality of flow guides has a linear profile between the inner perimeter and the outer perimeter of the slinger disk.

3. The assembly of claim 1, wherein the slinger disk includes a hub configured to extend along and engage the shaft.

4. The assembly of claim 1, wherein the lubricant flow is in a forward direction, opposite a windage direction.

5. An oil flow enhancer system for a turbine engine, the system comprising:
a compressor; a turbine;
a gearbox interposing the compressor and turbine; and a bearing assembly including:
a housing configured to receive a shaft and having at least one scavenge passage between an outer housing portion and an inner housing portion, the at least one scavenge passage being configured to provide a lubricant flow;
a slinger disk configured to be received in at least a portion of the housing and positioned about the shaft, the slinger disk being defined by an inner perimeter and an outer perimeter, the slinger disk having a first radial wall, a second radial wall, and a plurality of flow guides including protrusions interposed between opposing surfaces of the first radial wall and the second radial wall, the first radial wall, the second radial wall and the plurality of flow guides defining rectangular flow channels therebetween while providing a gap between the slinger disk and the forward housing portion, the plurality of flow guides and the opposing surfaces extending to the outer perimeter, and the plurality of flow guides being configured to direct the lubricant flow toward the at least one scavenge passage; and
a bearing configured to be received in at least a portion of the housing and positioned about the shaft and adjacent the slinger disk, wherein the slinger disk is configured to direct lubricant flow toward the at least one scavenge passage thereby forcing lubricant flow through the bearing.

6. The assembly of claim 5, wherein at least a portion of the plurality of flow guides has a linear profile between the inner perimeter and the outer perimeter of the slinger disk.

7. The assembly of claim 5, wherein the slinger disk includes a hub configured to extend along and engage the shaft.

8. The assembly of claim 5, wherein the lubricant flow is in a forward direction, opposite a windage direction.

9. A method for enhancing oil flow, the method comprising:

providing lubricant flow with a housing configured to receive a shaft and having at least one scavenge passage between an outer housing portion and an inner housing portion;

directing lubricant flow toward the at least one scavenge passage with a slinger disk configured to be received in at least a portion of the housing and positioned about the shaft, the slinger disk being defined by an inner perimeter and an outer perimeter, the slinger disk having a first radial wall, a second radial wall, and a plurality of flow guides including protrusions interposed between opposing surfaces of the first radial wall and the second radial wall, the first radial wall, the second radial wall and the plurality of flow guides defining rectangular flow channels therebetween while providing a gap between the slinger disk and the forward housing portion, and the plurality of flow guides and the opposing surfaces extending to the outer perimeter; and forcing lubricant flow through a bearing configured to be received in at least a portion of the housing and positioned about the shaft and adjacent the slinger disk.

10. The method of claim 9, wherein at least a portion of the plurality of flow guides has a linear profile between the inner perimeter and the outer perimeter of the slinger disk.

11. The method of claim 9, wherein the slinger disk includes a hub configured to extend along and engage the shaft.

12. The method of claim 9, wherein the lubricant flow is in a forward direction, opposite a windage direction.

* * * * *